United States Patent [19]

Choma et al.

[11] Patent Number: 4,484,551
[45] Date of Patent: Nov. 27, 1984

[54] AIR-AIR/FUEL CONTROL DEVICE

[75] Inventors: Michael A. Choma, Dearborn Heights; Philip W. Husak, Southgate; Aladar O. Simko, Dearborn Heights, all of Mich.

[73] Assignee: Ford Motor Company, Dearborn, Mich.

[21] Appl. No.: 511,023

[22] Filed: Jul. 5, 1983

[51] Int. Cl.³ ............................................. F02M 7/12
[52] U.S. Cl. ................................... 123/336; 123/442
[58] Field of Search ................ 123/336, 339, 442; 261/44 E, 44 F, 65

[56] References Cited

U.S. PATENT DOCUMENTS

| | | | |
|---|---|---|---|
| 2,326,791 | 8/1943 | Meade | 123/336 |
| 2,904,025 | 9/1959 | Scherenberg et al. | 123/336 |
| 3,561,412 | 6/1971 | Yagi et al. | 123/442 |
| 3,581,723 | 6/1971 | Herm | 123/442 |
| 4,253,440 | 3/1981 | Sumiyoshi et al. | 123/442 |
| 4,276,862 | 7/1981 | Matsumoto | 123/432 |
| 4,378,000 | 3/1983 | Moriya et al. | 123/442 |

Primary Examiner—William A. Cuchinski, Jr.
Attorney, Agent, or Firm—Robert E. McCollum; Clifford L. Sadler

[57] ABSTRACT

An air-air/fuel throttle body is provided with a secondary throttle valve of a differing diameter and operating in a different cross-sectional area of the throttle body induction passage, the upstream throttle valve being positively connected to the vehicle accelerator pedal to assure a like opening or closing movement of the latter throttle valve upon movement of the accelerator pedal, the construction assuring that main control of the flow of air and changes in manifold vacuum will be retained by the lower smaller diameter servo operated throttle valve operating in a smaller cross-sectional area.

8 Claims, 1 Drawing Figure

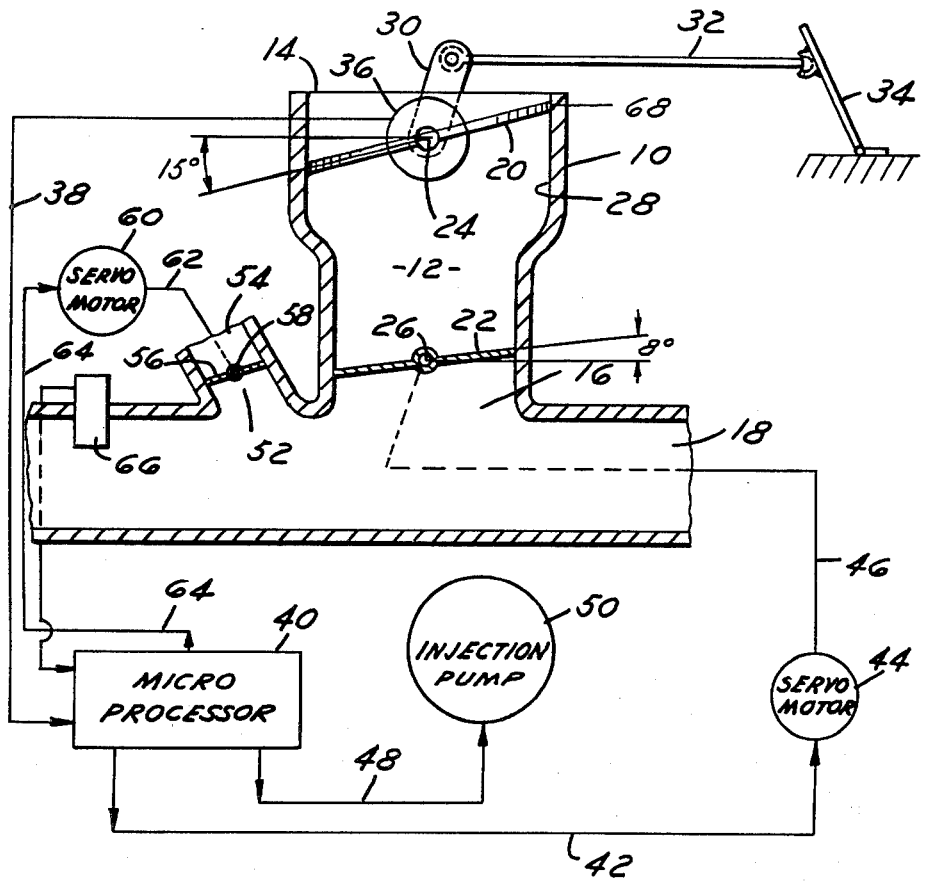

AIR-AIR/FUEL CONTROL DEVICE

This invention relates in general to an air-air/fuel throttling device for controlling the flow of fluid to an automotive type internal combustion engine. More particularly, it relates to one used in conjunction with a fuel injection system and includes a plurality of throttle valves of varying sizes in an induction passage to assure conformance of scheduled flow to driver demand.

The conventional carbureted fuel system usually consists of a pedal operated throttle valve movable in a carburetor induction passage to control both fuel and air flow into the engine. With this system, there is a time lag between the increase of the air flow upon depression of the vehicle accelerator pedal and the increase of fuel flow. More sophisticated fuel systems attempt to correct this by employing electronic fuel injection. However, many of the systems still employ the accelerator pedal-throttle valve connection that results in the air flow change preceding a change in fuel flow, providing a torque response that is weak in the part load operating region and stronger than desirable in the high load-enrichment region.

Accordingly, a more desirable fuel control system, such as is provided by the invention, would be an electronic fuel injection system using a direct fuel control arrangement in which the change in position of the vehicle accelerator pedal transfers driver torque demand directly to fuel delivery by means of an onboard type computer having output signals to a number of electronically operated servo mechanisms to change the fuel flow concurrent with a change in position of the air throttle valve.

This invention is concerned with a means to assure consistent and reliable operation of the fuel and air flow schedules in the event of a breakdown of the electrical system with the air throttle valve in a position other than desired. It accomplishes this by providing a secondary air throttle valve that is connected directly to the vehicle accelerator pedal to move as a unit with the pedal between its opening and closing positions, regardless of the position of the smaller main air throttle valve downstream. The secondary or additional throttle valve has a larger diameter and operates in an increased cross-sectional area of the induction passage in such a manner that under all normal operating conditions its open movement will have a negligible effect on control of air flow into the engine and permit the main air throttle valve downstream to maintain control of the engine manifold pressure changes.

It is an object of this invention, therefore, to provide an air-air/fuel flow control device that includes at least a pair of axially spaced fluid flow throttling valves, the upstream one of which is larger and connected directly to the vehicle accelerator pedal to be movable therewith in a positive manner at all times regardless of the tracking or not of the lower throttle valve.

Carburetors having more than one throttle valve for controlling air-air/fuel flow are known. For example, Scholl, U.S. Pat. No. 3,581,723, Meade, U.S. Pat. No. 2,326,791, and Yagi, U.S. Pat. No. 3,561,412, each show main and axillary throttle valves in the carburetor induction passage, with the position of the auxillary throttle valve being controlled pneumatically. However, in each case, the throttle valves are all of the same diameter cooperating with the same cross-sectional area of the induction passage so that during normal operating conditions the upper throttle valve has a definite influence over changes in the manifold vacuum level.

Scherenberg et al., U.S. Pat. No. 2,904,025, shows in FIG. 1 a fuel injected engine with a pump 20 that is controlled by mechanical linkage directly connected to a manually operated lever 27 that also controls a throttle valve 25. Downstream of the throttle valve is an auxillary throttle valve 33 controlled by a thermostat 34.

Matsumoto, U.S. Pat. No. 4,276,862, shows a plurality of throttle valves in a fuel injected throttle valve induction passage; flow through the passage is controlled by the lower throttle valve 33.

Sumiyoshi et al., U.S. Pat. No. 4,253,440, shows a pedal operated throttle valve 4 with an automatically operated upstream throttle valve 3 to maintain constant the vacuum between the valves.

In each of Scherenberg, Matsumoto and Sumiyoshi et al., again it will be noted that both of the throttle valves are of the same diameter and operate in the same constant cross-sectional area of the induction passage. During normal engine operating conditions, therefore, the upper throttle valve exerts a definite influence over increase of flow and changes in manifold vacuum levels in the passage in contrast to the construction proposed by this invention.

To summarize, it is a primary object of the invention to provide an air-air/fuel control device comprising a throttle body having a pair of axially spaced throttle valves, the upstream one of which is larger in diameter and operates in a larger cross-sectional area of the induction passage than the lower or downstream one so that under all normal operating conditions control of changes in the engine manifold vacuum levels and the flow through the induction passage will be by the downstream main throttle valve, the upper throttle valve, however, being connected directly to the vehicle accelerator pedal to assure a positive movement of the upper throttle valve coordinated with the movement of the accelerator pedal, regardless of the position of the downstream throttle valve.

Other objects, features and advantages of the invention will become more apparent upon reference to the succeeding, detailed description thereof, wherein the single FIGURE illustrates schematically a cross-sectional view of a portion of an air-air/fuel throttle body embodying the invention.

More specifically, the FIGURE shows a throttle body 10 having a stepped diameter air-air/fuel induction passage 12. The passage is open at its upper end 14 to air essentially at ambient/atmospheric pressure level. Generally, it would be connected to the clean air side of a conventional dry element type air cleaner, not shown, normally associated with an automotive type internal combustion engine. The lower portion 16 of induction passage 12 is mounted over and connected to the engine intake manifold 18 to be subject to the changing manifold vacuum levels therein.

Induction passage 12 contains a pair of disc type throttle valves 20 and 22 axially spaced from one another and fixed separately on shafts 24, 26 each rotatably mounted in the side walls of throttle body 10. The throttle valves can rotate from the essentially closed positions shown to nearly vertical wide open throttle positions whereafter they have negligible effects on air flow through the throttle body.

As shown, the upper or upstream throttle valve 20 is of a larger diameter than that of the lower or downstream throttle valve 22, and operates or rotates in a larger cross-sectional area of bore portion 28 of the throttle body. The axis of throttle valve 20 is pivotably connected by a link 30 and lever 32 to a conventional vehicle accelerator pedal 34 pivotally attached to the vehicle body. Surrounding and fixed to the axis of throttle valve 20 is a potentiometer 36 that is provided to sense the position of linkage 30 and, therefore, that of accelerator pedal 34. The varying voltage output signal from potentiometer 36 is then transmitted electrically by wiring 38 to a microprocessor or computer illustrated schematically at 40 for recording the position of accelerator pedal 34 at all times. This information is then transmitted into an electrical output signal via line 42 to a servo motor 44. The latter is connected by linkage 46 to shaft 26 of the lower or downstream throttle valve 22 to provide a movement of the latter throttle valve in a scheduled manner as dictated by the computer 40 concurrent with movement of throttle valve 20 and accelerator pedal 34.

Simultaneously, the output from computer 40 is relayed via wiring 48 to a fuel injection pump illustrated schematically at 50. In this case, the pump would supply fuel to the engine for combination with air passing through throttle body 10 to define a predetermined air/fuel charge. While not shown, a fuel injector could be located directly above open end 14 of throttle body 10 for single point type injection of fuel directly into the induction passage at a location adjacent the upper throttle valve 20. Alternatively, individual injector valves could be located adjacent each of the inlet ports to the engine cylinders, or one or more injectors could be located in portions of the intake manifold 18, as desired. The details of construction and operation of the fuel system are not given since they are known and conventional and are believed to be unnecessary for an understanding of the invention.

Completing the construction, intake manifold 18 has a branch inlet 52 for the recirculation of exhaust gases into the engine from an EGR (exhaust gas recirculation) passage 54. Passage 54 is controlled by a disc type butterfly valve 56 that is fixed on a shaft 58 rotatably mounted in the walls of passage 54. The valve is rotated between open and closed positions by a servo motor 60 operably pivotally connected thereto by linkage 62, as shown. Electrical input to the servo motor is provided through wiring 64 connected to computer 40, as shown. A sensing device 66 may provide additional information to computer 40, such as, for example, the intake manifold temperature or vacuum levels, etc.

Before proceeding to the operation, it should be noted that the closed position of upper throttle valve 20 in this case locates the valve at an angle to the horizontal of say, 15°, for example, and is greater than the angle at which the lower throttle valve 22 is located when closed, which could be, for example, 8°. Also, the cross-sectional area in which throttle valve 20 operates is considerably larger, say 45% larger, for example, than the area in which the lower throttle valve 22 operates. And finally, it should be noted that the upper edge 68 of throttle valve 20 in its closed position is only slightly below the upper edge of throttle body 10.

The reasons for the above requirements are to assure that when the larger upper throttle valve 20 opens upon depression of vehicle accelerator pedal 34, the flow area controlled by the upper throttle valve will increase very quickly to assure that subsequent changes in the flow level and manifold pressure changes in induction passage 12 under normal operating conditions will be controlled by the servo operated lower throttle valve 22. In other words, the pressure differential across throttle valve 20 normally will be essentially negligible, such as only 1/10th, for example, of the depression or pressure drop across the lower throttle valve 22. Under normal operating conditions, the position of the upper throttle valve 20 influences only fuel flow, and not airflow. This is due not to the angular position of valve 20, but the angular position of potentiometer 36. More specifically, for example, when lower throttle valve 22 is moved to a wide open or vertical position, to provide maximum airflow, the upper throttle valve 20 may be open only 60% of its full movement, as dictated by the position of accelerator pedal 34. This is because pedal 34, under the particular circumstances, may be only partially depressed, calling for a smaller schedule of fuel flow, which will be sensed by the position of potentiometer 36, so that throttle 20 is opened only, say, to a 60% position as stated above. Throttle valve 20 itself exerts no influence on the airflow in this position, merely on fuel flow and power. The air/fuel ratio at this point may be a lean 20:1. Depressing the accelerator pedal further, therefore, merely adds more fuel to change the power and air/fuel ratio to a richer 12:1 ratio, for example, by rotating potentiometer 36 further without changing the position of throttle valve 22.

In operation, therefore, the throttle valves are shown in their closed positions corresponding to the released engine idle or off position of vehicle accelerator pedal 34. However, throttle valve 22 normally will control idle speed airflow to provide an engine speed of, say, 600 rpm. The 15° angle of upper throttle valve 20 makes available a limited amount of greater airflow, if necessary. For instance, should the control of lower throttle valve 22 become inoperative, for some reason, and the lower valve move quite a bit more open, then control of idle speed airflow will be transferred to upper throttle valve 20, and idle speed would be regulated at, say, a higher level of 1200 rpm, for example, to prevent engine runaway.

Little or no EGR flow is desired at engine idle speed and, accordingly, EGR valve 56 will remain closed as shown. Depression of accelerator pedal 34, therefore, by its direct connection to throttle valve 20, will rotate the latter open as well as potentiometer 36, which will signal computer 40 to provide a particular fuel flow and also an output signal to servo motor 44 to rotate lower throttle valve 22 open by a scheduled amount to provide the desired airflow.

Closing movement of accelerator pedal 34 and throttle valve 20 will cause a decrease in fuel flow due to rotation of potentiometer 36 and closing rotation of throttle valve 22 to decrease airflow. In the event of a malfunction of the electrical system, servo motor 44 may fail to move the lower throttle valve 22 closed. However, because of the direct positive connection between pedal 34 and throttle valve 20, throttle valve 20 will close to the position shown regardless of the position of lower throttle 22. This thus assures control of airflow through throttle body 10 by throttle valve 20 to correspond to the position of pedal 34. In this particular instance, as stated previously, the idle speed or closed position of throttle valve 20 would throttle the airflow so that the engine speed would not exceed 1200–1500 rpm, for example.

From the foregoing, it will be seen that the invention provides a throttle body with a secondary or additional throttle valve that provides an overcontrol of the flow of air into the engine at certain times to provide a scheduled airflow in direct accordance with the movement of the vehicle accelerator pedal. It will also be seen that the servo operated main throttle valve provides the main control of changes in engine manifold vacuum and air flow during all normal operating conditions as a result of the sizing and angulation of the mechanically connected secondary throttle valve located upstream thereof that exerts essentially a negligible effect under normal engine operating conditions.

While the invention has been shown and described in its preferred embodiment, it will be clear to those skilled in the arts to which it pertains that many changes and modifications may be made thereto without departing from the scope of the invention.

We claim:

1. An air-air/fuel control device for a motor vehicle type internal combustion engine comprising a throttle body having an air/air-fuel induction passage open at one end to ambient air and connected at its opposite end to the engine intake manifold to be subject to the changing vacuum therein, axially spaced upstream and downstream throttle valves rotatably mounted in the passage for separate movements in a scheduled manner between open and closed positions for controlling flow through the passage, and means directly and indirectly connecting, respectively, the upstream and downstream throttle valves to the vehicle accelerator pedal for movement of each of the valves in response to movement of the pedal to assure positive movement of the upstream throttle valve in response to a movement of the pedal to a closed position regardless of the movement or non-movement of the downstream throttle valve, the diameter of the upstream valve being larger than that of the downstream valve and operating in a cross-sectional area surrounding the upstream valve larger than that surrounding the downstream valve permitting movement of the downstream valve to provide control of airflow through the passage during normal operating conditions.

2. A device as in claim 1, wherin the differential areas are controlled to establish only a negligible pressure drop in the area of the passage between the two throttle valves as compared to the pressure differential across the downstream valve in a closed position.

3. A device as in claim 1, wherein the closed position of the upstream throttle valve is rotatively more open than that of the downstream valve.

4. A device as in claim 1, wherein the upper edge of the upstream throttle valve in its closed position is closely downstream of the open end of the passage so as to quickly increase the flow area contiguous to the upstream valve upon opening movement of the latter valve.

5. A device as in claim 2 or 3 or 4, including servo means connected to the downstream valve for rotating the same, and control means operably responsive to the position of the accelerator pedal for activating the servo means to move the downstream valve.

6. A device as in claim 5, the control means including an accelerator pedal position sensor, the servo means being electrically actuated, and a microprocessor electrically connected to the sensor and to the servo means for operating the servo means in response to movement of the pedal.

7. A device as in claim 5, including an accelerator pedal position sensor fixed for rotation with the upstream valve, and linkage means pivotally connecting the upstream valve and position sensor directly to the pedal.

8. A device as in claim 1, the induction passage having a stepped diameter with the larger cross-sectional area adjacent the upstream throttle valve.

* * * * *